April 27, 1937.　　　D. SANTINI　　　2,078,687
ELEVATOR CONTROL SYSTEM
Filed Jan. 4, 1936　　　4 Sheets-Sheet 1

WITNESSES:
Michael Stark
RR Lockwood

INVENTOR
Danilo Santini.
BY
ATTORNEY

April 27, 1937. D. SANTINI 2,078,687

ELEVATOR CONTROL SYSTEM

Filed Jan. 4, 1936 4 Sheets-Sheet 2

WITNESSES:
Michael Stark
RR Lockwood

INVENTOR
Danilo Santini.
BY
ATTORNEY

April 27, 1937. D. SANTINI 2,078,687
ELEVATOR CONTROL SYSTEM
Filed Jan. 4, 1936  4 Sheets-Sheet 3

INVENTOR
Danilo Santini.

April 27, 1937.  D. SANTINI  2,078,687

ELEVATOR CONTROL SYSTEM

Filed Jan. 4, 1936  4 Sheets-Sheet 4

WITNESSES:
Michael Stark
RR Lockwood

INVENTOR
Danilo Santini.
BY
ATTORNEY

Patented Apr. 27, 1937

2,078,687

UNITED STATES PATENT OFFICE 2,078,687

ELEVATOR CONTROL SYSTEM

Danilo Santini, Chicago, Ill., assignor to Westinghouse Electric Elevator Company, Chicago, Ill., a corporation of Illinois Application January 4, 1936, Serial No. 57,534

14 Claims. (Cl. 172—239)

My invention relates, generally, to electrical control systems. It has particular relation to control systems of the Ward-Leonard type, and it constitutes an improvement over and a modification of the control system disclosed in the copending application, Serial No. 38,770, filed August 31, 1935 by Kenneth M. White et al.

In the copending application, a Ward-Leonard control system is illustrated, together with the provision of a regulator-generator interconnected in a Wheatstone bridge circuit for controlling the flow of current through the main field winding of the generator of the Ward-Leonard system independently of the current flow therethrough from the controls which are provided for varying the speed of the motor. The main field winding of the generator is connected in one of the branches of a balanced Wheatstone bridge circuit, the remaining branches comprising resistors. The armature of a regulator-generator is connected across one pair of opposite terminals of the Wheatstone bridge circuit, while the remaining pair of opposite terminals of the Wheatstone bridge circuit is connected to an independent control source through the customary controls which are used for varying the flow of current through the main field winding of the generator. The regulator-generator is provided with series and shunt field windings, which are arranged to be, respectively, responsive to the current flowing to and the voltage applied to the motor of the Ward-Leonard control system. These windings are differentially related so that the flux generated by the combination is a function of the speed of the motor. A differential field winding is provided in series circuit relation with the main field winding of the generator in the branch of the Wheatstone bridge circuit containing it and this winding is differentially related to the combined effects of the series and shunt field windings. As a result of this combination of field windings in the regulator-generator, it is possible to introduce into the main field winding of the generator a corrective action which will cause the motor of the Ward-Leonard control system to operate at a fixed speed for each setting of the controls regardless of the variable operating characteristics of the system, such as changes in load on the elevator car, temperature changes, changes in resistance of conductors due to increase in temperature, etc. The presence of the differential field winding of the regulator-generator in series circuit relation with the main field winding of the generator provides an anti-hunting feature which controls the functioning of the regulator-generator in accordance with the correction which must be made in the current flowing through the main field winding of the generator, and the departure of the value of this current from the required value for a particular setting of the controls.

Under actual operating conditions, I have found that it is desirable to make certain modifications in the circuits shown in the copending application, for the purpose of extending its range of operation, sensitivity and flexibility in functioning. Also, I have discovered certain alternative means for accomplishing certain of the functions obtained in the copending application, all of which will be set forth in detail hereinafter.

The object of my invention, generally stated, is to provide a system for controlling the operation of a Ward-Leonard control system which shall be simple, efficient and flexible in operation, and which may be readily and economically manufactured and installed.

An important object of my invention is to provide for selectively changing the compounding effects of a regulator-generator used for controlling the operation of a Ward-Leonard control system.

A more specific object of my invention is to provide for variably connecting the differential field winding of a regulator-generator in a balanced Wheatstone bridge circuit for changing the compounding action of the regulator generator in controlling the operation of a Ward-Leonard control system.

Another important object of my invention is to provide for changing the effect of a regulator-generator used for controlling the operation of a Ward-Leonard control system, depending upon whether the system is operating at low or high speed.

Another more specific object of my invention is to provide for variably connecting a resistor in series circuit relation with the armature of a regulator-generator arranged to control the operation of a Ward-Leonard control system, depending on the speed at which the Ward-Leonard control system is operated.

A further object of my invention is to provide for measuring the speed of the motor of a Ward-Leonard system by means of an auxiliary generator and controlling the functioning of a regulator-generator in accordance with the voltage of the auxiliary generator to, in turn, control the functioning of the Ward-Leonard system.

Still another object of my invention is to provide a transformer for interconnecting a regulator-generator circuit arranged to control a Ward-Leonard system and the Ward-Leonard system so that transient changes in the Ward-Leonard system will be reflected in the action of the regulator-generator.

Other objects of my invention will, in part, be obvious and, in part, appear hereinafter.

My invention, accordingly, is disclosed in the embodiments hereof shown in the accompanying drawings and comprises the features of construction, combination of elements and arrangement of parts, which will be exemplified in the constructions hereinafter set forth, and the scope of the application of which will be indicated in the appended claims.

For a more complete understanding of the nature and scope of my invention, reference may be had to the following detailed description, taken in connection with the accompanying drawings, in which.

Figure 7:
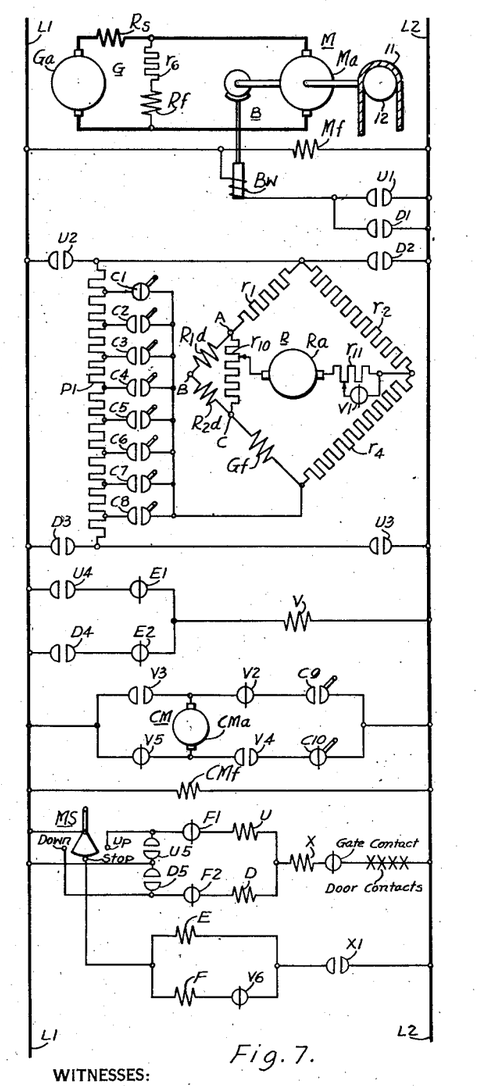
Fig. 7 illustrates diagrammatically one embodiment of my invention.
Figure 7A:
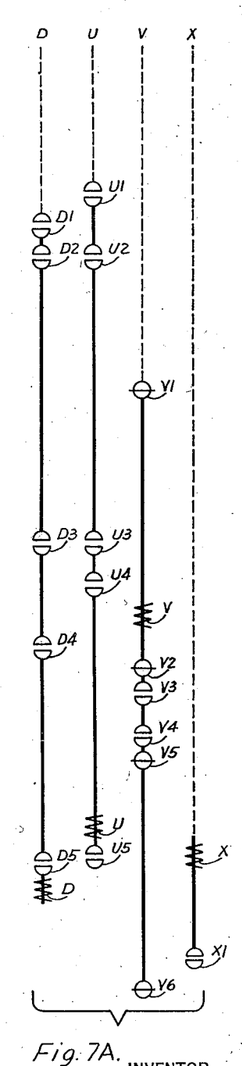
Fig. 7A shows the relationship between certain of the operating windings and contact members of the relays and switches illustrated in Fig. 7.
Figure 8:
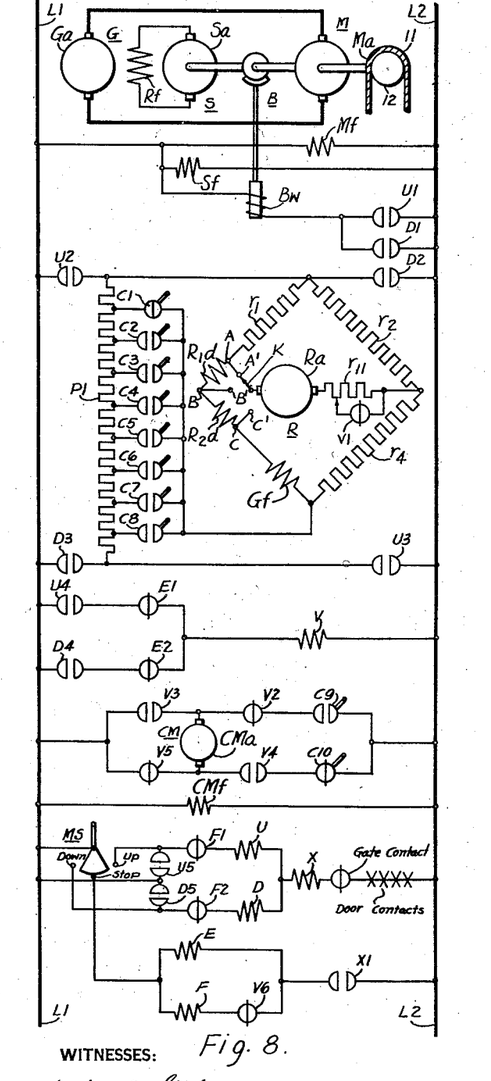
Fig. 8 illustrates diagrammatically another embodiment of my invention.
Figure 8A:
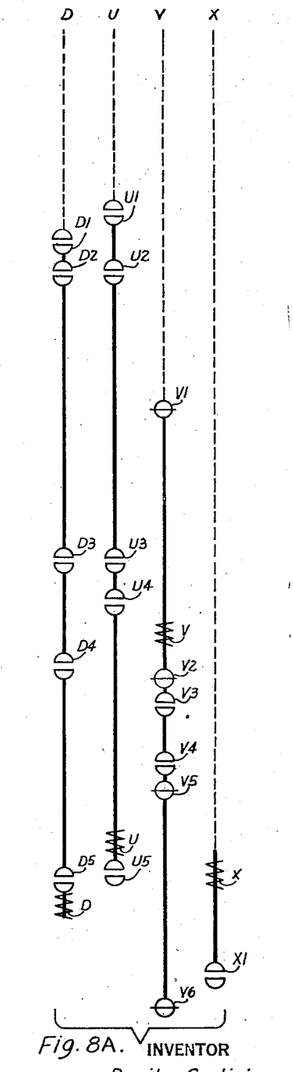
Fig. 8A shows the relationship between certain of the operating windings and contact members of the relays and switches illustrated in Fig. 8.
Figure 9:
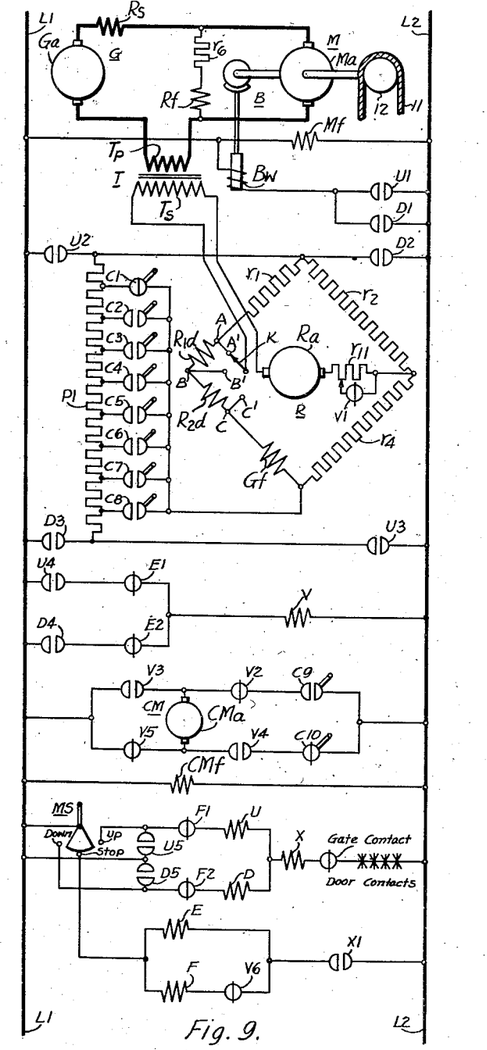
Fig. 9 illustrates still another embodiment of my invention.
Figure 9A:
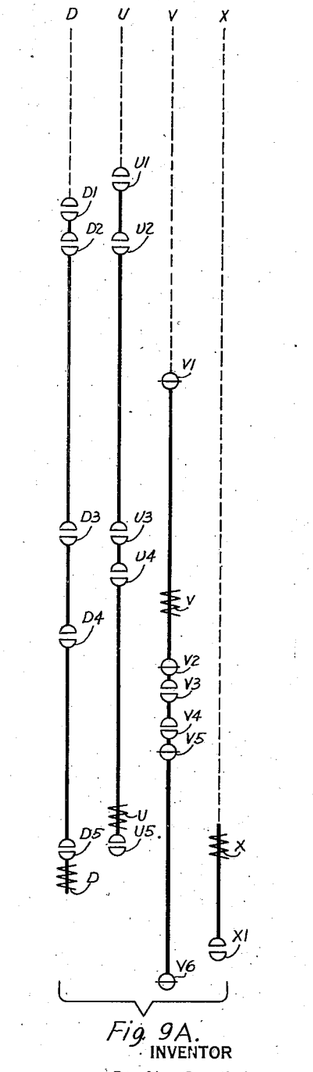
Fig. 9A shows the relationship between certain of the operating windings and contact members of the relays and switches illustrated in Fig. 9.

In Figs. 7A, 8A and 9A, normally open contacts are indicated by a pair of slightly-spaced semicircular symbols, and normally closed contacts are indicated as a circle having a line drawn therethrough. In each case, the contact symbols are positioned on the page so as to lie opposite the corresponding contact symbol of the adjacent circuit diagram, Fig. 7, 8 or 9, respectively. In Figs. 7A, 8A and 9A, the assembly of contacts and one or more coils constituting a single relay are shown in a vertical line spaced horizontally from the other assemblies corresponding to other relays.

According to my invention, I have provided for altering the degree of compounding action which may be provided in a Ward-Leonard control system with a regulator-generator by the provision of circuit means for variably connecting the armature of the regulator-generator in a Wheatstone bridge control circuit and varying the effective position of the differential field winding of the regulator-generator in the circuit. With the full differential field winding connected in series circuit relation with the armature of the regulator-generator, a maximum of cumulative regulation of the system will be obtained, while a minimum of cumulative regulation will be obtained when the armature of the regulator-generator is connected between the differential field winding and the main field winding of the generator of the Ward-Leonard system. Various degrees of cumulative regulation or compounding may be obtained midway between these two positions by providing appropriate connections to the differential field winding. This may be accomplished by the provision of a resistor connected in shunt circuit relation with the differential shunt winding of the regulator-generator or by the provision of taps connecting various points of the differential field winding to a tap-changing switch and thence, to the armature of the regulator-generator. Both of these systems are illustrated herein.

In order to further control the regulation of the Ward-Leonard system at high speed, I have provided a regulating potentiometer connected in series circuit relation with the armature of the regulator-generator, the effective value of which may be manually varied, as desired. In addition, the effective value of the potentiometer may be automatically altered in response to the operation of the control system in changing from low speed to high speed.

In some instances, it may be undesirable to provide a field winding in the regulator-generator which is connected in series circuit relation with the circuit connecting the generator and motor of the Ward-Leonard system. Such a connection necessitates the provision of additional leads and circuit complications. An indication of the speed of the motor of the Ward-Leonard system may be obtained by providing an auxiliary generator on its shaft, which is arranged to excite the shunt field winding of the regulator-generator. The flux which is generated by the shunt field winding of the regulator-generator is then directly proportional to the speed of the motor. Variations in the effective flux resulting from the combination of the series and shunt field windings due to changes in the operating characteristics of the motor are then eliminated.

In some instances, it is desirable to increase or decrease the effectiveness of the regulator-generator in accordance with the transient flow of current between the generator and motor of the Ward-Leonard system. In order to smooth out fluctuations in the control resulting from the action of the regulator-generator, a voltage may be introduced into its armature circuit which will oppose fluctuating or peak voltages generated therein, which are originated by transient changes in the Ward-Leonard system. In other instances, it may be desirable to increase the effectiveness of the regulator-generator, as for example, during leveling operations, and, therefore, connections are provided for introducing into the armature circuit of the regulator-generator a voltage in additive relation which is a function of the transient change in the Ward-Leonard system.

Figure 1:
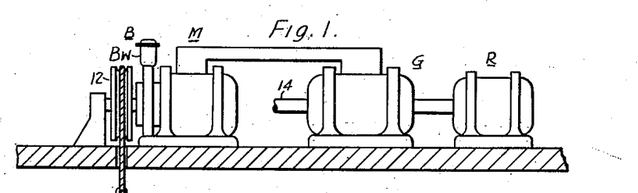
Figure 1 illustrates diagrammatically the arrangement of an elevator car in a hatchway.

Referring now particularly to Fig. 1 of the drawings, the reference character 10 designates, generally, an elevator car which may be supported in a hatchway or shaft by means of a cable 11 which is passed over a sheave 12 and balanced by suitable counterweights 13. The elevator car 10 is provided with a slowdown inductor relay E and a landing inductor relay F. The slowdown inductor relay E is provided with normally closed contact members E1 and E2 while the landing inductor relay F is provided with normally closed contact members F1 and F2. When the operating winding of the slowdown inductor relay E is energized, no action takes place until the contact members E1 or E2 come into proximity, respectively, with the inductor plates UE or DE, depending upon the direction of travel of the elevator car. Assuming that the elevator car 10 is travelling in the up direction, and that the operating winding of the slowdown inductor relay E is energized, the contact members E1 will be opened as soon as they are moved into proximity to the inductor plate UE. A resulting control function then takes place which will be set forth hereinafter. The contact members F1 and F2 of the landing inductor relay F are also opened when they come into proximity, respectively, to the inductor plates UF or DF. The elevator car 10 is also provided with a master switch MS having three positions, the extreme outer positions corresponding to up and down movements of the car, and the central position to a position to stop the car.

In order to operate the elevator car 10 in the hatchway, a Ward-Leonard control system is provided which comprises a motor M that is arranged to be mechanically coupled, as illustrated, to the sheave 12. As shown in Figs. 7, 8 and 9 of the drawings, the motor M comprises an armature Ma and a main field winding Mf, the latter being arranged to be separately excited from normally energized conductors L1 and L2. A brake B is provided having a brake-releasing winding Bw for releasing it on energization of the motor M. The motor M is arranged to be energized by means of a generator G having, as shown in Figs. 6, 7, 8 and 9, an armature Ga and a main field winding Gf. The armature Ga of the generator G is arranged to be mounted on a shaft 14 which may be driven by any suitable motive means, such as an induction motor (not shown), that may be connected to an alternating-current source of supply.

Figure 4:
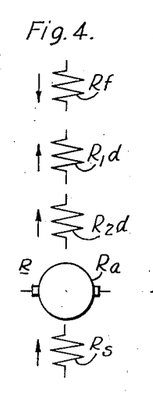
Figs. 4, 5 and 6 illustrate schematically the arrangement of the regulator-generator armature and field windings, and the arrangement of the armature and field winding of the generator of the Ward-Leonard control system.

With a view to controlling the functioning of the system shown in Figs. 7, 8 and 9 of the drawings, a regulator-generator R is provided having an armature Ra which may be mounted on the shaft 14. As shown in Fig. 4 of the drawings, the regulator-generator R is provided with a shunt-type field winding Rf, differential field windings R1d and R2d, and a series field winding Rs. As indicated by the arrows, the differential field windings R1d and R2d, and the series field winding Rs are arranged to generate fluxes in a reverse direction to the flux generated by the shunt-type field winding Rf.

Figures 5, 6:
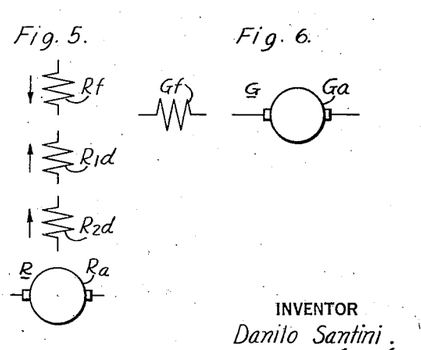

In Figs. 5 and 8 of the drawings, it will be observed that the series field winding Rs is omitted and that an auxiliary generator S is provided having an armature Sa which is driven by the motor M of the Ward-Leonard system, and a separately excited field winding Sf. The armature Sa is connected to energize the shunt-type field winding Rf of the regulator-generator R, thereby impressing a voltage on it which is a function of the speed of the motor M. The particular connections for the various field windings and the armature of the regulator-generator in the control systems are illustrated in Figs. 7, 8 and 9 of the drawings and they will be described in detail hereinafter.

Referring now particularly to Fig. 7 of the drawings, in response to the operation of the master switch MS, up or down reversing switches U and D are operated. On the operation of either of the up or down switches, an auxiliary switch X is operated to complete a circuit for energizing the operating windings of the inductor relays E and F. As soon as either the up or the down switch U or D is operated, a potentiometer P1 is connected across the conductors L1 and L2. The current flowing through the potentiometer P1 is in one direction when the up reversing switch U is energized, and in the reverse direction when the down reversing switch D is energized.

Figure 2:
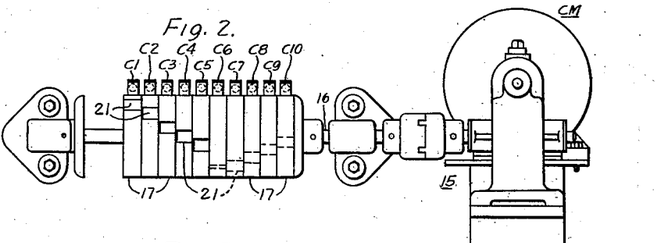
Fig. 2 is a view in side elevation showing the construction of a controller used for varying the resistance connected in circuit with the main field winding of the generator of a Ward-Leonard control system.
Figure 3:
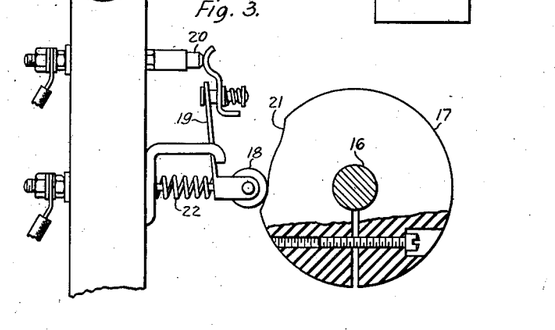
Fig. 3 is a view, partly in side elevation and partly in section, of a typical arrangement of the contact members of the controller shown in Fig. 2.

In order to accelerate the motor M, the current flowing through the main generator field winding Gf is increased by increasing the voltage applied thereto from the potentiometer P1. This voltage is gradually increased by the successive closing and opening of contact members C2 through C7, which, as shown in Figs. 2 and 3 of the drawings, are arranged to be successively operated by means of a control motor CM. The control motor CM is arranged to operate through a reduction gearing mechanism 15 to rotate a shaft 16 on which a series of cams 17, composed of insulating material, is mounted. As shown more clearly in Fig. 3 of the drawings, a cam 17 is arranged to engage a roller 18 on the periphery thereof and to normally hold a movable contact member 19 out of engagement with a fixed contact member 20. The cam 17 is provided with a recessed portion 21 which is arranged to permit the roller 18 to move under the influence of a biasing spring 22, so that the movable contact member 19 is permitted to engage the fixed contact member 20. It will be understood that the cams 17 may be positioned on the shaft 16 in any desired relative positions to effect the sequential opening and closing of the contact members C1 through C8, as may be desired. In order to stop the operation of the control motor CM after it has reached its limit of travel, contact members C9 and C10 are provided. The contact members C10 are arranged to remain in the closed position until the control motor has reached its limit of travel after being initially energized. At this time, contact members C10 are opened to terminate further operation of the control motor CM in this direction, contact members C9 having been closed as soon as the control motor CM was energized. The contact members C9 are arranged to remain in the closed position until the control motor CM has been restored to the initial position, at which time they are opened. It will be understood that the cams 17, associated with these contact members, may be suitably arranged to effect this desired operation. As illustrated in Fig. 7 of the drawings, the control motor CM is provided with an armature CMa and a separately excited field winding CMf. The change in direction of rotation of the armature CMa is effected by reversing the polarity of the voltage applied thereto from the conductors L1 and L2 by means of a speed relay V.

It is desirable to independently control the flow of current through the main field winding Gf of the generator from two sources, one of the sources comprising the energized conductors L1 and L2 across which the potentiometer P1 is connected, and the other source comprising the armature Ra of the regulator-generator. For this purpose, the Wheatstone bridge circuit is employed, comprising the customary four branches, three of which may include resistors $r_1$, $r_2$ and $r_4$, the remaining branch comprising the differential field winding R2d of the regulator-generator and the main field winding of the generator. The differential field winding $R_1d$ is connected, as illustrated, in the branch containing the resistor $r_1$. The armature $Ra$ of the regulator-generator is connected across a pair of opposite terminals of the bridge circuit through a voltage dividing resistor $r_{10}$ and a regulating potentiometer $r_{11}$, while the remaining pair of terminals is connected through the potentiometer $P1$ to the energized conductors $L1$ and $L2$. The series field winding $Rs$ of the regulator-generator is arranged to be connected, as illustrated, in the circuit connecting the armatures $Ga$ and $Ma$ of the generator $G$ and motor $M$, respectively. The shunt-type field winding $Rf$ of the regulator-generator is connected through a resistor $r_6$ across the terminals of the motor armature $Ma$. The resistor $r_6$ is employed in order to reduce the heat loss in the shunt-type field winding $Rf$, and consequently, the effect of a change in its resistance, due to temperature rise, to a minimum.

It will be observed that the voltage dividing resistor $r_{10}$ is connected in shunt circuit relation with the two parts of the differential field windings $R_1d$ and $R_2d$. By providing a sliding connection, as illustrated, along the resistor $r_{10}$ from the armature $Ra$ of the regulator-generator, it is possible to alter the degree of cumulative action or compounding of the regulator-generator in its action in controlling the functioning of the Ward-Leonard system. Thus, if the sliding connection along the resistor $r_{10}$ is positioned at the upper end as at A, a maximum amount of cumulative regulation will be applied by the regulator-generator. Likewise, if the connection is placed at the lower end of the resistor $r_{10}$, as at C, a minimum degree of cumulative regulation will be available. When the sliding connection is midway between the ends of the resistor $r_{10}$, it is effectively connected midway between the differential field windings $R_1d$ and $R_2d$ as at B and, therefore, a proportionate cumulative regulation of the Ward-Leonard system by the regulator-generator is available at this point.

It will be observed that the regulating potentiometer $r_{11}$ is connected in series circuit relation with the armature $Ra$ of the regulator-generator. By means of this potentiometer, it is possible to alter the effectiveness of the regulating-generator, depending upon various operating conditions. Furthermore, it is possible to automatically change the effectiveness of the regulator-generator by short circuiting certain portions of the regulating potentiometer $r_{11}$ under different operating conditions. For example, under certain operating conditions it may be desirable to provide the maximum resistance of the regulating potentiometer in series circuit relation with the armature $Ra$ when the system is operating at high speed. For this purpose, contact members $V1$ are provided, as illustrated, which are opened when the Ward-Leonard system is operated at high speed and which are closed when it is operating at low speed. Under certain other operating conditions, it may be desirable to reverse this sequence and to provide for short circuiting a portion of the regulating potentiometer when the Ward-Leonard system is operating at high speed and to insert the full value of the resistance of the regulating potentiometer in the circuit when the system is operating at low speed. Operating conditions will determine which of these sequences is desirable and the value of the resistance of the potentiometer which is necessary for the various steps in the sequence.

The Wheatstone bridge circuit is provided as illustrated for controlling the current flowing through the main field winding $Gf$ in response to various operating characteristics of the Ward-Leonard system independently of changes in current flow therethrough caused by different settings of the controls which are arranged to alter the speed of the motor from low speed to full speed, and vice versa. A detailed analysis of the manner in which the Wheatstone bridge circuit accomplishes this function is set forth in the copending application referred to hereinbefore. Therefore, a detailed analysis of the functioning of the Wheatstone bridge circuit will not be set forth herein.

In describing the operation of the system shown in Fig. 7 of the drawings, it will be assumed that the conductors $L1$ and $L2$ have applied thereto a suitable control voltage, that the generator $G$ and the regulator-generator $R$ are being operated at the proper speed and that it is desired to move the elevator car 10 in the up direction. The operator then moves the master switch MS to the up position to effect the energization of the operating winding of the up reversing switch U, as well as the energization of the operating winding of the auxiliary switch X. The circuit for effecting the energization of these windings may be traced as follows: $L1$, MS, up contacts, $F1$, U, X, gate contact, door contacts, $L2$. At contact members U5, a holding circuit is provided around the master switch MS. The brake B is released by the energization of the brake winding $Bw$ in response to the operation of the up reversing switch U. The circuit for releasing the brake winding may be traced as follows: $L1$, $Bw$, $U1$, $L2$.

The potentiometer $P1$ is connected directly across the conductors $L1$ and $L2$ on the closure of contact members U2 and U3 in response to the operation of the up reversing switch U. Current is then caused to flow through the main generator field winding $Gf$ in part because of the voltage which is obtained from the first section of the potentiometer $P1$, due to the fact that contact members C1 are closed, and in part because of the voltage which is obtained from the armature $Ra$ of the regulator generator $R$.

The operating winding of the speed relay V is energized in response to the operation of the up reversing switch U over a circuit which may be traced as follows: $L1$, U4, $E1$, V, $L2$. As a result of the energization of the speed relay V, a circuit is completed for energizing the armature $CMa$ of the control motor CM. This circuit may be traced as follows: $L1$, V3, $CMa$, V4, C10, $L2$. The contact members C1 are then opened and the remaining contact members C2 through C7 are successively closed and opened, contact members C8 being closed but not opened, thereby increasing the voltage which is applied to the main generator field winding $Gf$ to correspondingly increase the voltage which is applied to the armature $Ma$ of the motor $M$. As soon as the contact members C10 are opened, the armature $CMa$ is deenergized, contact members C8 remaining closed.

A further result of the operation of the speed relay V is to open contact members $V1$, thereby inserting the resistor $r_{11}$ entirely in series circuit relation with the armature $Ra$. Depending upon the operating conditions, as set forth hereinbefore, it may, in some instances, be desirable to provide the control members $V1$ in the normally open condition and to close them on operation of the system at full speed.

As has been set forth hereinbefore, it is desirable that the speed of the motor $M$ be at a certain value for each of the steps of control voltage obtained from the potentiometer P1. It is then possible to obtain a smooth acceleration curve which will be unaffected by the many variables in the system that have been set forth in detail hereinbefore. In addition, it is also desired that the same speed relationship exist when the contact members C1 through C8 are operated in a reverse order to effect the deceleration of the motor M and the elevator car driven thereby.

I have found that the desired speed relationship will exist regardless of the variable characteristics of the elevator system, or the connections to the potentiometer P1, when the regulator-generator R is employed, its armature Ra being connected through the resistors $r_{10}$ and $r_{11}$ to the potentiometer P1, and its field windings being connected as shown. Because of the connection of the differential field windings $R_1d$ and $R_2d$, in series circuit relation with the main generator field winding Gf, the changes which are introduced to effect a corrective action through the generator G are immediately reflected in the voltage which is generated in the armature Ra of the regulator-generator. As a result, the corrective effect which is applied by the regulator-generator R is, in a sense, proportional to the degree of variation in the speed of the motor M from the desired speed.

The sliding connection along the voltage dividing resistor $r_{10}$ is adjusted to provide the desired degree of cumulative regulation, depending upon the operating conditions of the system. If a relatively large amount of cumulative regulation is desired, the sliding connection will be positioned at or near the upper end of the resistor $r_{10}$ while if a small amount of cumulative regulation is desired, it will be positioned near or at the lower end of the resistor $r_{10}$. It will be understood that different values may be obtained by positioning the movable connection at various points along the resistor $r_{10}$.

When it is desired to stop the elevator car at a particular floor, the operator centers the master switch, thereby completing a circuit for energizing the operating winding of the slowdown inductor relay E. This circuit may be traced as follows: L1, MS, stop contacts, E, X1, L2. As soon as the contact members E1 come into proximity with the up inductor plate UE, they are opened and the previously traced energizing circuit for the operating winding of the speed relay V is interrupted. Contact members V1 are then closed to short circuit a portion of the regulating resistor $r_{11}$.

The armature of the control motor CMa is energized in a reverse direction to effect the operation of the contact members C1 through C8 in a reverse sequence. The circuit for now energizing the control motor armature CMa may be traced as follows: L1, V5, CMa, V2, C9, L2. The contact members C7 through C2 are successively closed and opened to effect a decrease in the flow of current through the main generator field winding Gf. During this interval, the regulator-generator R is effective to maintain the speed of the motor M at values corresponding to the contact members which are closed. As a result, regardless of the variable conditions or loading of the elevator system, or the connections to the potentiometer P1, the elevator car 10 will be decelerated at a uniform rate.

A further result of the deenergization of the speed relay V is to close contact members V6 to complete an obvious energizing circuit for the operating winding of the landing inductor relay F in parallel with the operating winding of the slowdown inductor relay E. As soon as contact members F1 come into proximity with the up inductor plate UF, the previously traced energizing circuit for the operating winding of the up reversing switch U and the auxiliary switch X, is interrupted. These switches are deenergized. The potentiometer P1 is disconnected from the conductors L1 and L2 and the previously traced energizing circuit for the brake winding Bw is opened. The brake B is then applied and the elevator car 10 is brought to rest at the desired floor.

Referring now particularly to Fig. 8 of the drawings, it will be observed that the voltage dividing resistor $r_{10}$ is omitted and that taps are provided at A, B and C which terminate in buttons A', B', C', respectively, of a tap-changing switch having an operating arm K which may be connected to one terminal of the armature Ra of the regulator-generator. The same effect as obtained by means of the resistor $r_{10}$ may be obtained with these connections, except that definite steps are provided for altering the degree of compounding action of the regulating-generator.

It will be recalled that, in this embodiment of the invention, the series field winding Rs of the regulator-generator is omitted and that an auxiliary generator S is provided for energizing the shunt-type field winding Rf of the regulator-generator. The auxiliary generator S is driven as illustrated, by means of the motor M and, therefore, the flux generated by the shunt-type field winding Rf will be a function of the speed of the motor M.

A detailed description of the sequence of operation of the system shown in Fig. 8 will not be given since it is identical with the operation described in detail hereinbefore in connection with Fig. 7 of the drawings. It will be understood that the principal difference arises in the provision of the auxiliary generator S, which in combination with the shunt-type field winding Rf, takes the place of the combination of the series field winding Rs and the shunt-type field winding shown in Fig. 7 of the drawings. When the auxiliary generator S is used certain variable operating characteristics of the motor M are not reflected in the functioning of the regulator-generator as is the case when the system using the series field winding Rs is employed.

Referring now particularly to Fig. 9 of the drawings, it will be observed that provision is made for introducing the effects of transient changes in the circuit connecting the generator G and the motor M into the action of the regulator-generator R. As there illustrated, a transformer T is provided having a primary winding Tp connected in series circuit relation between the armature Ga of the generator and the armature Ma of the motor. The secondary winding Ts of the transformer T is connected in series circuit relation with the armature Ra of the regulator-generator. It will be apparent that a sudden change in the flow of current between the armatures Ga and Ma will cause a voltage to be induced in the secondary winding Ts, which may either increase or decrease the effectiveness of the regulator-generator, depending upon the polarity of the connections of the secondary winding Ts into the regulator-generator circuit. If it is desired to reduce or smooth out the effect produced by the regulator, due to peak currents flowing through the circuit connecting the armatures Ga and Ma, then the secondary winding Ts is connected so that the voltage induced therein will oppose the voltage generated by the armature Ra. In certain instances, as in levelling, it is desirable to obtain the maximum effectiveness of the regulator-generator and, therefore, it may be desirable to reverse the connections of the secondary winding Ts so that the voltage induced therein on change in flow of current through the primary winding Tp will increase the voltage applied to the Wheatstone bridge circuit by the armature Ra of the regulator-generator, rather than to oppose it. It will be understood that the operating conditions will determine which of these two connections is to be employed.

A detailed description of the sequence of operation of the system shown in Fig. 9 will not be set forth, since it is substantially the same as that set forth hereinbefore in connection with Fig. 7 of the drawings. It will be understood that the principal difference between the two systems is in the provision of the transformer T, which will not alter the sequence of operation of the various relays and switches.

Since certain further changes may be made in the foregoing constructions and different embodiments of the invention may be made without departing from the scope thereof, it is intended that all matter shown in the accompanying drawings or set forth in the foregoing description shall be interpreted as illustrative and not in a limiting sense.

I claim as my invention:

1. In a Ward-Leonard control system, a first dynamo-electric machine mechanically connected to a load, a second dynamo-electric machine electrically connected to said first machine, said second dynamo-electric machine having a field winding, a source of control current, resistance means, conducting means connecting said field winding, said resistance means and said source to form a divided circuit having said field winding in a first parallel branch, said resistance means in a second parallel branch, and having the junctions of said first and second parallel branches connected with said source, regulator-generator means connected to be reponsive to a variable operating characteristic of said first dynamo-electric machine, said regulator-generator means being connected to said parallel branches in such relationship as to circulate current through said field winding but to produce substantially no voltage difference between said junctions, and means for modifying the connections of said regulator-generator means to said parallel branches to provide different compounding effects in said second dynamo-electric machine.

2. In a Ward-Leonard control system, a first dynamo-electric machine mechanically connected to a load, a second dynamo-electric machine electrically connected to said first machine, said second dynamo-electric machine having a field winding, a source of control current, resistance means, conducting means connecting said field winding, said resistance means and said source to form a divided circuit having said field winding in a first parallel branch, said resistance means in a second parallel branch, and having the junctions of said first and second parallel branches connected with said source, regulator-generator means connected to be responsive to a variable operating characteristic of said first dynamo-electric machine, said regulator-generator means being connected to said parallel branches in such relationship as to circulate current through said field winding but to produce substantially no voltage difference between said junctions, means responsive to the current flowing through said field winding for proportionately opposing the functioning of said regulator-generator means in response to said variable operating characteristic, and circuit means for selectively varying the effectiveness of said last-named means to provide different compounding effects in said second dynamo-electric machine.

3. In a Ward-Leonard control system, in combination, a first dynamo-electric device operatively connected to a load, a second dynamo-electric device electrically connected to said first device, a main field winding for said second device, a balanced Wheatstone bridge circuit including said main field winding in one of its branches, a controller for connecting one pair of opposite terminals of said bridge circuit to a control source a regulator-generator disposed to be responsive to a variable operating characteristic of said first dynamo-electric device, an armature in said regulator-generator disposed to be connected across the remaining pair of terminals of said bridge circuit, a field winding in said regulator-generator connected to be responsive to the current flowing through said main field winding, and circuit means for selectively varying the action of said field winding in said regulator-generator to provide different compounding effects in said second dynamo-electric device.

4. In a Ward-Leonard control system, in combination, a first dynamo-electric device operatively connected to a load, a second dynamo-electric device electrically connected to said first device, a main field winding for said second device, a balanced Wheatstone bridge circuit including said main field winding in one of its branches, a controller for connecting one pair of opposite terminals of said bridge circuit to a control source, a regulator-generator disposed to be responsive to a variable operating characteristic of said first dynamo-electric device, a field winding in said regulator-generator connected in series circuit relation with said main field winding, a resistor connected in shunt circuit relation to said field winding, and an armature in said regulator-generator disposed to be variably connected across the remaining pair of opposite terminals of said bridge circuit through said resistor.

5. In a Ward-Leonard control system, in combination, a first dynamo-electric device operatively connected to a load, a second dynamo-electric device electrically connected to said first device, a main field winding for said second device, a balanced Wheatstone bridge circuit including said main field winding in one of its branches, a controller for connecting one pair of opposite terminals of said bridge circuit to a control source, a regulator-generator disposed to be responsive to a variable operating characteristic of said first dynamo-electric device, an armature in said regulator-generator disposed to be connected across the remaining pair of terminals of said bridge circuit, resistance means disposed to be variably connected in series circuit relation with said armature, and a field winding in said regulator-generator connected to be responsive to the current flowing through said main field winding.

6. In a Ward-Leonard control system, in combination, a first dynamo-electric device operatively connected to a load, a second dynamo-electric device electrically connected to said first device, a main field winding for said second device, a balanced Wheatstone bridge circuit including said main field winding in one of its branches, a controller for connecting one pair of opposite terminals of said bridge circuit to a control source, control means for said controller, a regulator-generator disposed to be responsive to a variable operating characteristic of said first dynamo-electric device, an armature in said regulator-generator disposed to be connected across the remaining pair of terminals of said bridge circuit, a resistor connected in series circuit relation with said armature, and contact means disposed to be operated on operation of said control means for varying the effectiveness of said resistor.

7. In a Ward-Leonard control system, in combination, a first dynamo-electric device operatively connected to a load, a second dynamo-electric device electrically connected to said first device, a main field winding for said second device, a balanced Wheatstone bridge circuit including said main field winding in one of its branches, a controller for connecting one pair of opposite terminals of said bridge circuit to a control source, control means for said controller, a regulator-generator disposed to be responsive to a variable operating characteristic of said first dynamo-electric device, a field winding in said regulator-generator connected in series circuit relation with said main field wnding, a resistor connected in shunt circuit relation to said field winding, an armature in said regulator-generator disposed to be variably connected across the remaining pair of opposite terminals of said bridge circuit through said resistor, a second resistor connected in series circuit relation with said armature, and contact means disposed to be operated on operation of said control means for varying the effectiveness of said last-named resistor.

8. In a Ward-Leonard control system, in combination, a first dynamo-electric device operatively connected to a load, a second dynamo-electric device electrically connected to said first device, a main field winding for said second device, circuit means for variably connecting said main field winding to a source of control current, resistance means, conducting means connecting said main field winding and said resistance means in parallel branch circuits to said circuit means, a regulator-generator interconnected in said parallel branch circuits for varying the current flowing through said main field winding independently of said variably connected circuit means, a field winding in said regulator-generator, an auxiliary generator disposed to be driven by said first dynamo-electric device, and circuit means interconnecting said field winding and said auxiliary generator whereby the voltage applied to said field winding is a function of the speed of said first dynamo-electric device.

9. In a Ward-Leonard control system, in combination, a first dynamo-electric device operatively connected to a load, a second dynamo-electric device electrically connected to said first device, a main field winding for said second device, a balanced Wheatstone bridge circuit including said main field winding in one of its branches, a controller for connecting one pair of opposite terminals of said bridge circuit to a control source, a regulator-generator having an armature connected between the remaining pair of terminals of said bridge circuit, a field winding in said regulator-generator, an auxiliary generator disposed to be driven by said first dynamo-electric device, and circuit means interconnecting said field winding and said auxiliary generator whereby the voltage applied to said field winding is a function of the speed of said first dynamo-electric device.

10. In a Ward-Leonard control system, in combination, a first dynamo-electric device operatively connected to a load, a second dynamo-electric device electrically connected to said first device, a main field winding for said second device, a balanced Wheatstone bridge circuit including said main field winding in one of its branches, a controller for connecting one pair of opposite terminals of said bridge circuit to a control source, a regulator-generator having an armature connected between the remaining pair of terminals of said bridge circuit, a shunt-type field winding in said regulator-generator, an auxiliary generator disposed to be driven by said first dynamo-electric device, circuit means interconnecting said shunt-type field winding and said auxiliary generator, a differential field winding in said regulator-generator connected to be responsive to the current flowing through said main field winding, and circuit means for selectively varying the action of said differential field winding to provide different compounding effects in said second dynamo-electric device.

11. In a Ward-Leonard control system, in combination, a first dynamo-electric device operatively connected to a load, a second dynamo-electric device electrically connected to said first device, a field winding for said second device, circuit means for variably connecting said field winding to a source of control current, a regulator-generator connected to vary the current flowing through said field winding independently of said variably connected circuit means, and means for varying the action of said regulator-generator in controlling the flow of current through said field winding in accordance with transient changes in the flow of current between said dynamo-electric devices.

12. In a Ward-Leonard control system, in combination, a first dynamo-electric device operatively connected to a load, a second dynamo-electric device electrically connected to said first device, a field winding for said second device, circuit means for variably connecting said field winding to a source of control current, resistance means, conducting means connecting said main field winding and said resistance means in parallel branch circuits to said circuit means, a regulator-generator connected to be responsive to a variable operating characteristic of said first dynamo-electric device and interconnected in said parallel branch circuits for varying the current flowing through said field winding independently of said variably connected circuit means, and means for varying the action of said regulator-generator in controlling the flow of current through said field winding in accordance with transient changes in the flow of current between said dynamo-electric devices.

13. In a Ward-Leonard control system, in combination, a first dynamo-electric device operatively connected to a load, a second dynamo-electric device, circuit means interconnecting said devices, a transformer having a primary winding connected in said circuit means and a secondary winding, a main field winding for said second device, a balanced Wheatstone bridge circuit including said main field winding in one of its branches, a controller for connecting one pair of opposite terminals of said bridge circuit to a control source, a regulator-generator disposed to be responsive to a variable operating characteristic of said first dynamo-electric device, and an armature in said regulator-generator disposed to be connected between the remaining pair of terminals of said bridge circuit through said secondary winding whereby transient changes in the flow of current between said devices are reflected in the action of said regulator-generator.

14. In a Ward-Leonard control system, in combination, a first dynamo-electric device operatively connected to a load, a second dynamo-electric device, circuit means interconnecting said devices, a transformer having a primary winding connected in said circuit means and a secondary winding, a main field winding for said second device, a balanced Wheatstone bridge circuit including said main field winding in one of its branches, a controller for connecting one pair of opposite terminals of said bridge circuit to a control source, a regulator-generator disposed to be responsive to a variable operating characteristic of said first dynamo-electric device, an armature in said regulator-generator connected in series circuit relation with said secondary winding and between the remaining pair of terminals of said bridge circuit, a field winding in said regulator-generator connected to be responsive to the current flowing through said main field winding, and circuit means for selectively varying the action of said field winding in said regulator-generator to provide different compounding effects in said second dynamo-electric device.

DANILO SANTINI.